United States Patent [19]
Brey et al.

[11] 3,852,143
[45] Dec. 3, 1974

[54] TURRET ASSEMBLY

[75] Inventors: Wilhelm Brey, Cuyahoga Falls, Ohio; William Hostetler, Santa Ana, Calif.; Earl Ferdnand Loeffler, Akron, Ohio; Hubert Ernest Kolm, Louisville, Ohio; Fred Grove Elder, Atwater, Ohio

[73] Assignee: The Firestone Tire & Rubber Company, Akron, Ohio

[22] Filed: Sept. 15, 1971

[21] Appl. No.: 180,920

Related U.S. Application Data

[62] Division of Ser. No. 10,579, Feb. 11, 1970, Pat. No. 3,700,526.

[52] U.S. Cl. .............................. 156/396, 156/111
[51] Int. Cl. .......................................... B29h 17/00
[58] Field of Search .......................... 156/111, 396

[56] References Cited
UNITED STATES PATENTS

| | | | |
|---|---|---|---|
| 1,334,185 | 3/1920 | Stevens | 156/396 |
| 2,208,324 | 7/1940 | Haase | 156/396 |
| 2,253,781 | 8/1941 | Haase | 156/111 |
| 2,407,152 | 9/1946 | Haase | 156/111 |
| 3,223,573 | 12/1965 | Deist | 156/111 |
| 3,306,804 | 2/1967 | Black et al. | 156/111 X |
| 3,687,756 | 8/1972 | Appleby et al. | 156/396 |

*Primary Examiner*—Clifton B. Cosby

[57] ABSTRACT

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turret units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

2 Claims, 4 Drawing Figures

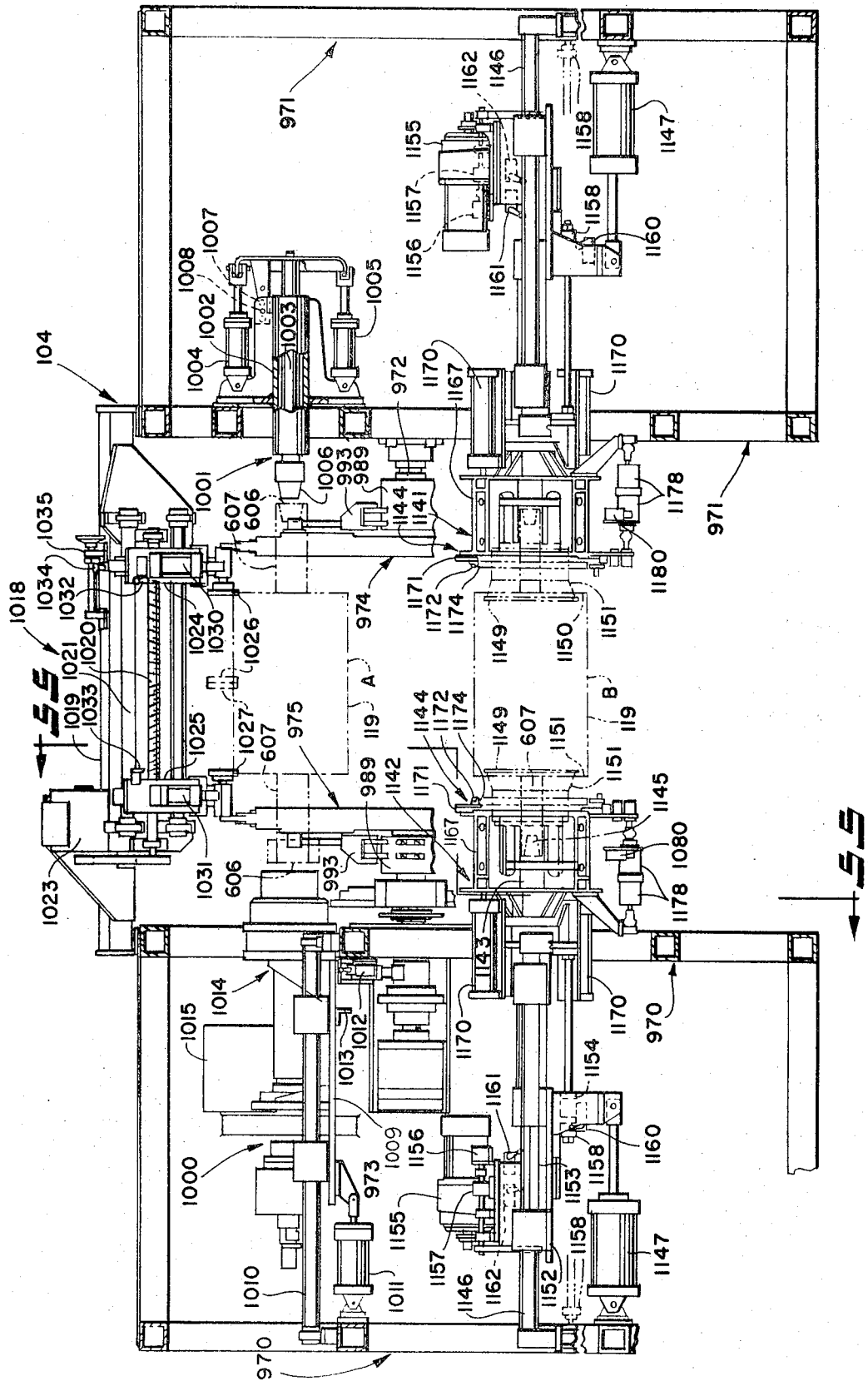

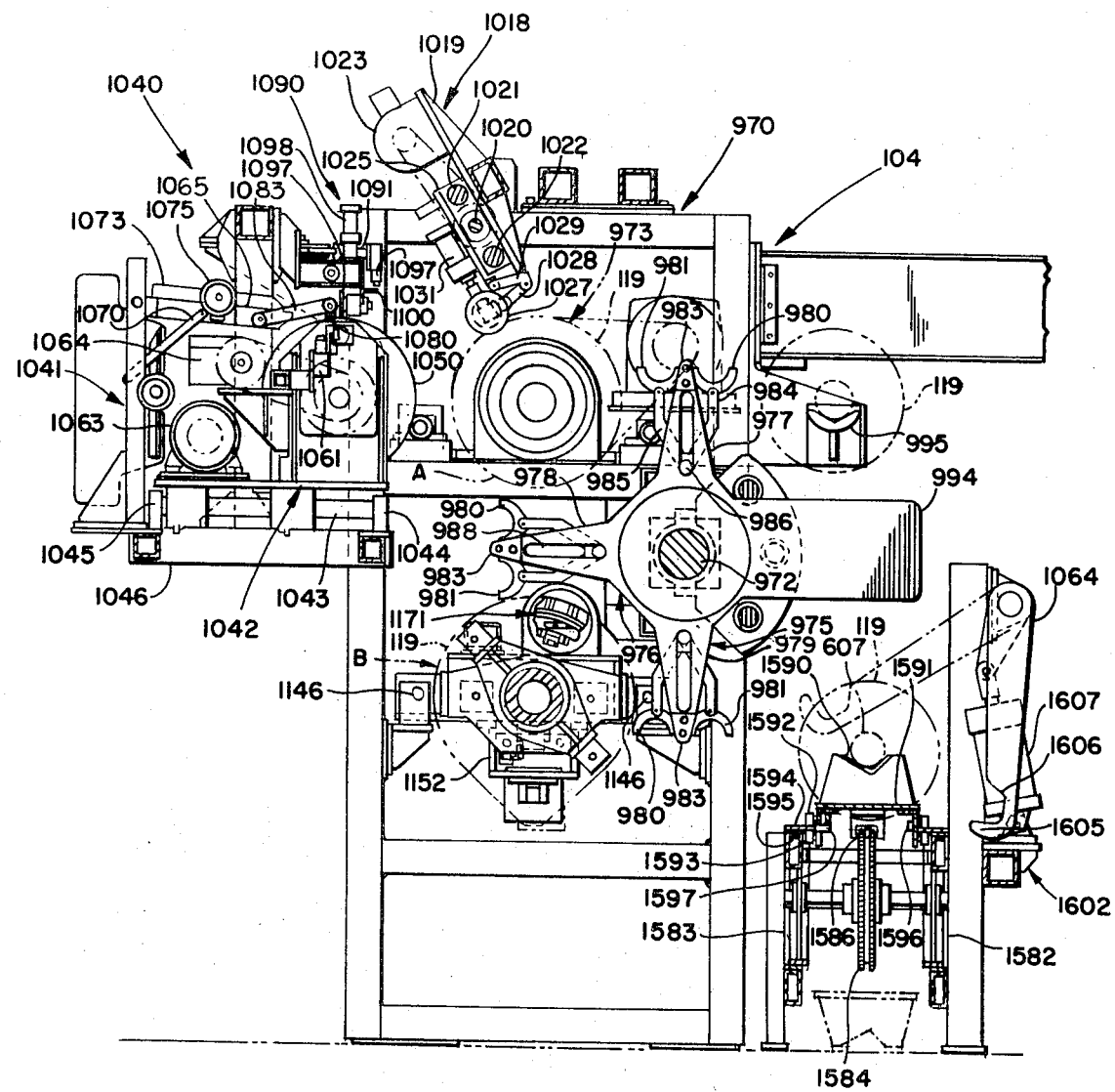

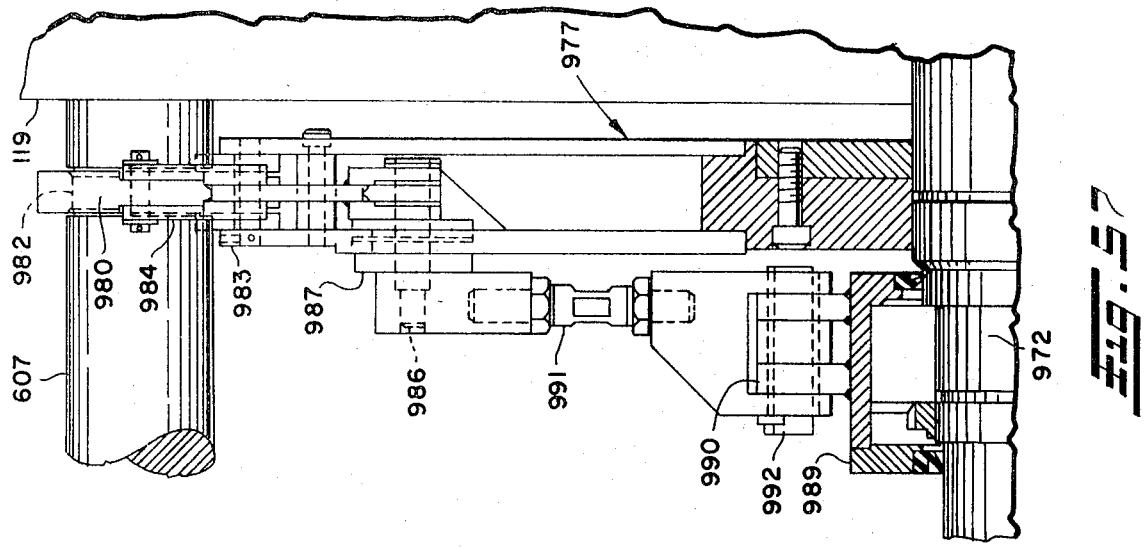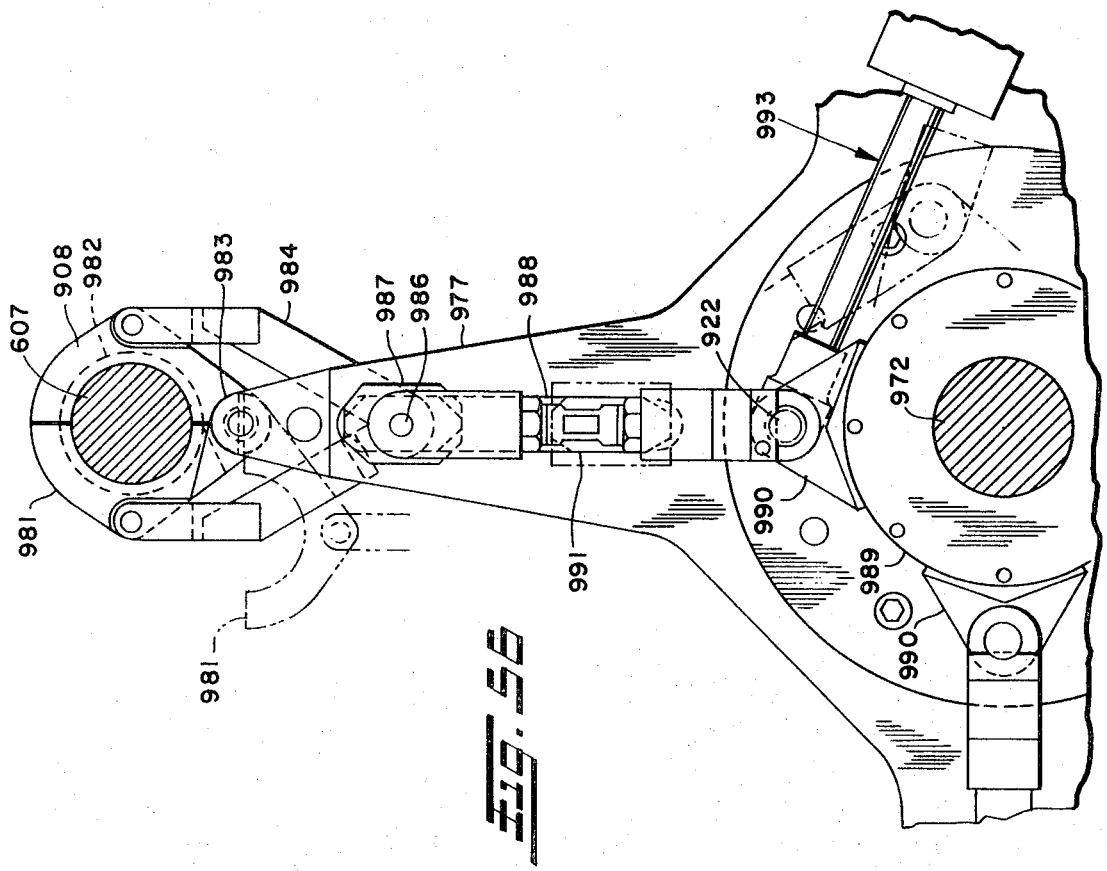

TURRET ASSEMBLY

This is a division of application Ser. No. 10,579, filed Feb. 11, 1970, now U.S. Pat. No. 3,700,526, the disclosure of which is hereby incorporated herein by reference, and which may be consulted for relation between the several inventive concepts of the continuing divided inventions.

DESCRIPTION OF THE FIGURES OF THE DRAWING

The following description of the invention will be better understood by referring to the annexed drawing, wherein:

FIGS. 1-53 and 58-97 appear in U.S. Patent 3,700,526 and are incorporated herein by reference.

FIG. 54 is a side view of the first turret assembly for stitching plies, setting beads, and applying tread cushion;

FIG. 55 is a section viewed from the line 55-55 of FIG. 54;

FIG. 56 is a plan view of a turret arm of the first turret assembly;

FIG. 57 is a side view of the turret arm.

TURRET ASSEMBLY

The BA unit 104 (FIGS. 54-55) comprises a pair of turret frames 970 and 971 in spaced relation from the 2-PLY unit 103. The building drums 119 are held between the turret frames 970 and 971 in a plurality of arcuately spaced positions, or at Station A where a strip of tread cushion is applied over the second ply material and the plies are stitched and at Station B where the beads are set.

A drive shaft 972 is journalled for rotation between the turret frames 970 and 971. A conventionally designed hydraulic motor assembly, generally indicated at 973, is provided for rotating the drive shaft 972 in either direction. A pair of drum movers 974 and 975 are keyed to the drive shaft 972 in parallel relation for unitary movement with the drive shaft 972 to rotate the building drums 119 between the different stations of the BA unit 104. The description of the drum movers 974 and 975 will be given in relation to drum mover 975, since both units are similar and operate in unison.

Turret Frame and Arms

The drum mover 975 (FIG. 54) comprises a turret arm frame 976 with a plurality of outstanding turret arms 977-979. The turret arms 977-979 are in predetermined arcuate spaced relation corresponding to the arcuate spacing between the different stations of the BA unit 104. The following description of the turret arms will be given in relation to turret arm 977, since all of them are similar.

The turret arm 977 (FIGS. 56-57) comprises a pair of oppositely disposed fingers 980 and 981 which are movable into and out of mating, clasping engagement with the shaft 607 of a building drum 119, and more particularly into a circular recess 982 formed in the drum shaft 607. The fingers 980 and 981 are rotatably mounted on the outstanding end 983 of the turret arm 977. A pair of link arms 984 and 985 are coupled to the fingers 980 and 981 intermediate their extremities to rotate them into and out of engagement with the drum shaft 607. The link arms 984 and 985 are pivotally mounted on a pin 986 carried by a guide block 987, which is reciprocable in an elongated axial slot 988 formed in the turret arm 977.

A collar 989 is mounted for rotation about the drive shaft 972 adjacent the turret arm frame 976. A plurality of similar brackets 990 are secured to the collar 989 in arcuate spaced relation to the arcuate spacing of the turret arms 977-979. A connecting link 991 is pivotally mounted on the pivot pins 986 and 992 carried by the guide block 987 and collar bracket 990. An air cylinder 993 is rotatably mounted on the outstanding plate 994 of the turret arm frame 976 and coupled to the pivot pin 992 of the collar bracket 990 for rotating the collar 989 to operate the fingers 980 and 981.

A pair of overhead drum rests 995 are positioned on the turret frames 970 and 971 for receiving building drums 119 from the 2-PLY unit 103 and the DT unit 106. The turret arms 977 and 979 are in aligned vertical relation when the turret arm frame 976 is in its rest position.

Providing other operating conditions of the BA unit 104 are satisfied, the turret arm frames 976 are rotated in unison to position the turret arms 977 for grabbing the shaft 607 of a building drum 119 positioned in the drum rests 995, turret arms 978 for grabbing the shaft 607 of a drum lid in unit A, and turret arms 975 for grabbing the shaft 607 of a drum 119 in unit B. The turret arm frames 976 are then rotated in the opposite direction to position the turret arms 977, 978 and 975 for depositing the building drums 119 at the Stations A, B and in position for pickup by arms 1604, respectively. When in position, units A, B and arms 1604 engage drums and fingers 980-981 release drums 119. The turret arm frames 976 are then rotated back to their rest positions.

What is claimed is:

1. Mechanism for clasping a tire building drum by its drum shaft and rotating it in a vertical plane to a plurality of spaced stations, comprising
   a. a drive shaft;
   b. arcuately spaced radial turret arms fixed at each end of said drive shaft;
   c. a pair of arcuate fingers at the radially outer end of each arm, pivoted to open and close selectively about a tire building drum shaft;
   d. means to rotate said drive shaft; and
   e. means to operate said fingers.

2. A mechanism as in claim 1, wherein said means to operate comprises link arms engaging said fingers and connected to a block slidable on said arm.

* * * * *